Dec. 13, 1966 W. MANDLER 3,291,553
PHOTOGRAPHIC OBJECTIVE HAVING FOUR LENS MEMBERS
Filed Nov. 1, 1962
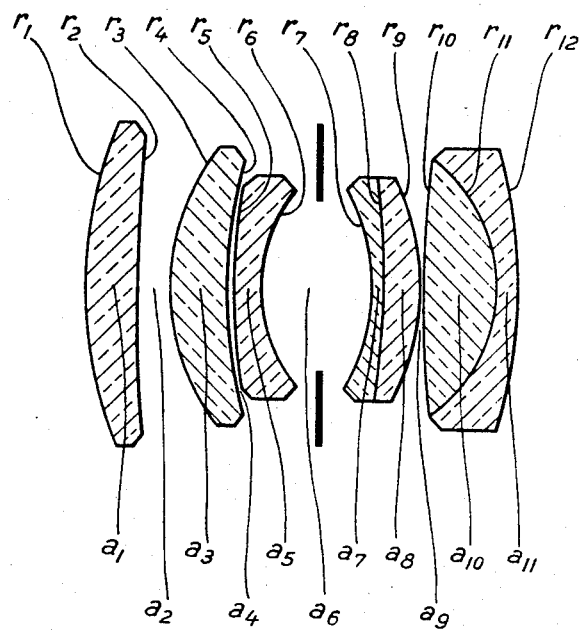
INVENTOR
WALTER MANDLER
BY
AGENT

United States Patent Office 3,291,553
Patented Dec. 13, 1966

3,291,553
PHOTOGRAPHIC OBJECTIVE HAVING FOUR LENS MEMBERS
Walter Mandler, Midland, Ontario, Canada, assignor to Ernst Leitz G.m.b.H., Wetzlar, Germany, a corporation of Germany
Filed Nov. 1, 1962, Ser. No. 234,657
Claims priority, application Germany, Nov. 4, 1961, L 40,391
1 Claim. (Cl. 350—209)

The present invention relates to improvements in photographic objectives, and more particularly to a Gauss lens with four members.

It is the primary object of the present invention to improve objectives of this type by combining outstanding correction of chromatic aberration with a generally excellent correction of spherical aberration.

This object has been accomplished by constructing an otherwise conventional photographic objective according to the parameters given below, reference being had to the single figure of the accompanying drawing.

The drawing shows an optical objective constructed according to this invention and represented in axial section, comprising four lens members or sets of one or more component lenses having their radii of curvature $r_i$ numbered from left to right for purpose of reference. Radii of faces of mutually contiguous component lenses are represented by a single $r_i$, and altogether there are twelve distinct radii: $r_1, r_2 \ldots r_{12}$. The axial thicknesses of the respective component lenses and spacings between adjacent non-contiguous lenses are represented by $a_i$ numbered in similar manner, from the left or front to the right or rear. Altogether there are eleven thicknesses and spacings: $a_1, a_2 \ldots a_{11}$.

The first lens is a simple convergent meniscus having respective front and rear radii $r_1$ and $r_2$, having thickness $a_1$, and being spaced by distance $a_2$ from the next lens. The second lens member consists of two air-spaced lenses, which together have a negative power of refraction, their respective radii being $r_3, r_4$ and $r_5, r_6$; their respective thicknesses are $a_3$ and $a_5$, the space between being $a_4$. A diaphragm, represented schematically by two aligned heavy black lines spaced from one another on opposite sides of the axis, follows the last mentioned lens and precedes the third lens member, which is a cemented negative meniscus spaced from the last-mentioned lens by distance $a_6$ and having two component lenses with respective thicknesses $a_7$ and $a_8$ and with front, common, and rear radii $r_7, r_8$, and $r_9$. The fourth and last lens member of the system is a cemented convergent doublet spaced at a further distance of $a_9$, the thicknesses of the respective component lenses being $a_{10}$ and $a_{11}$ and their front, common, and rear radii being $r_{10}, r_{11}$, and $r_{12}$.

An objective meeting the indicated requirements has practically no coma, particularly at full opening of the diaphragm. The following table prescribes such an objective in terms of reciprocal radii, $\rho_i = 1/r_i$; axial thickness or spacing, $a_i$; refractive indices relates to the e-line (5460.7 A.), $n_e$; and Abbé numbers (reciprocal of the dispersive power) related to the e-line, $v_e$.

The following deviations are permissible from the specific values of the parameters given in the foregoing table, with the frame of reference constituted by the sphere in the $n$-dimensional space $$z = \sqrt{\sum_i (x - x^1)_i^2}$$

where $x$ and $x'$ represent specified and alternative values of any one of the foregoing parameters; $i$ represents a reference numeral therefor; and $z$ represents a tolerance value as follows: for the reciprocal radii $\leq 2.0$; for the axial distances, $\leq 0.1$; for the refractive indices related to the e-line, $\leq 0.2$; and for the Abbé-numbers related to the e-line, $\leq 20.0$.

In this sense, the axial distances $$\frac{a}{i}$$

for example, of an objective constructed according to the invention and the axial distances of an objective of the general and conventional four lens member construction herein described and claimed are comparative parameters. The same holds true for the respective reciprocal radii $\rho_i$, refractive indices, $n_e$; and Abbé numbers, $v_e$.

TABLE
[Focal length: 1.0    Relative aperture: 1:1.4]

| $\rho$ | $a$ | $n_e$ | $v_e$ |
|---|---|---|---|
| $\rho_1 = +1.2502$ | $a_1 = 0.1022$ | 1.7919 | 47.2 |
| $\rho_2 = +0.3569$ | $a_2 = 0.0572$ | | |
| $\rho_3 = +2.3802$ | $a_3 = 0.1124$ | 1.7919 | 47.2 |
| $\rho_4 = +1.1574$ | $a_4 = 0.0145$ | | |
| $\rho_5 = +0.8644$ | $a_5 = 0.0469$ | 1.7685 | 26.8 |
| $\rho_6 = +3.4861$ | $a_6 = 0.2125$ | | |
| $\rho_7 = -2.7105$ | $a_7 = 0.0232$ | 1.7231 | 29.3 |
| $\rho_8 = -0.6471$ | $a_8 = 0.0676$ | 1.7919 | 47.2 |
| $\rho_9 = -2.0842$ | $a_9 = 0.0019$ | | |
| $\rho_{10} = +0.5306$ | $a_{10} = 0.1352$ | 1.7479 | 44.7 |
| $\rho_{11} = -3.3400$ | $a_{11} = 0.0483$ | 1.7205 | 48.0 |
| $\rho_{12} = -1.0454$ | | | |

I claim:

A photographic objective having a diaphragm and comprising four coaxial lens members spaced axially from one another and including a first lens member consisting of a convergent meniscus, a negative second lens member consisting of two air-spaced lenses, said first and second lens members being in front of the diaphragm, a third lens member consisting of a negative cemented meniscus and a positive cemented fourth lens member, said third and fourth lens members being behind the diaphragm, the reciprocal lens radii $\rho$ and the axial thicknesses and spacings $a$ being as given in the following table, by reference to the accompanying drawing, the refractive indices $n_e$ and the Abbé numbers $v_e$ of the lenses also as given in the following table:

TABLE
[Focal length: 1.0    Relative aperture: 1:1.4]

| $\rho$ | $a$ | $n_e$ | $v_e$ |
|---|---|---|---|
| $\rho_1 = +1.2502$ | $a_1 = 0.1022$ | 1.7919 | 47.2 |
| $\rho_2 = +0.3569$ | $a_2 = 0.0572$ | | |
| $\rho_3 = +2.3802$ | $a_3 = 0.1124$ | 1.7919 | 47.2 |
| $\rho_4 = +1.1574$ | $a_4 = 0.0145$ | | |
| $\rho_5 = +0.8644$ | $a_5 = 0.0469$ | 1.7685 | 26.8 |
| $\rho_6 = +3.4861$ | $a_6 = 0.2125$ | | |
| $\rho_7 = -2.7105$ | $a_7 = 0.0232$ | 1.7231 | 29.3 |
| $\rho_8 = -0.6471$ | $a_8 = 0.0676$ | 1.7919 | 47.2 |
| $\rho_9 = -2.0842$ | $a_9 = 0.0019$ | | |
| $\rho_{10} = +0.5306$ | $a_{10} = 0.1352$ | 1.7479 | 44.7 |
| $\rho_{11} = -3.3400$ | $a_{11} = 0.0483$ | 1.7205 | 48.0 |
| $\rho_{12} = -1.0454$ | | | |

(References on following page)

References Cited by the Examiner

UNITED STATES PATENTS 2,878,723  3/1959  Herzberger _____ 88—57

JEWELL H. PEDERSEN, *Primary Examiner.*

JOHN K. CORBIN, *Examiner.*

DAVID H. RUBIN, *Assistant Examiner.*